(12) United States Patent
Karube

(10) Patent No.: US 7,184,285 B2
(45) Date of Patent: Feb. 27, 2007

(54) DC-DC CONVERSION CIRCUIT

(75) Inventor: Masao Karube, Fukaya (JP)

(73) Assignee: Toshiba Matsushita Display Technology Co., Ltd., Tokyo (JP)

( * ) Notice: Subject to any disclaimer, the term of this patent is extended or adjusted under 35 U.S.C. 154(b) by 331 days.

(21) Appl. No.: 10/971,068

(22) Filed: Oct. 25, 2004

(65) Prior Publication Data

US 2005/0099167 A1    May 12, 2005

(30) Foreign Application Priority Data

Nov. 12, 2003    (JP)    ............... 2003-382336

(51) Int. Cl.
*H02M 3/07*    (2006.01)
(52) U.S. Cl. ...................................................... 363/60
(58) Field of Classification Search ............... 323/311; 363/59, 60, 62
See application file for complete search history.

(56) References Cited

U.S. PATENT DOCUMENTS

| | | | |
|---|---|---|---|
| 4,488,061 A * | 12/1984 | Mukawa et al. ............... 326/97 |
| 4,922,402 A * | 5/1990 | Olivo et al. ................... 363/60 |
| 5,982,223 A * | 11/1999 | Park et al. ................... 327/536 |
| 6,026,003 A * | 2/2000 | Moore et al. ................. 363/60 |
| 6,037,622 A * | 3/2000 | Lin et al. ..................... 257/299 |
| 6,172,886 B1 * | 1/2001 | Lauterbach et al. .......... 363/60 |
| 6,429,723 B1 * | 8/2002 | Hastings ..................... 327/536 |
| 6,483,728 B1 * | 11/2002 | Johnson et al. .............. 363/60 |
| 6,617,796 B2 | 9/2003 | Sasaki et al. ............. 315/169.1 |
| 6,642,773 B2 * | 11/2003 | Lin et al. ..................... 327/536 |
| 6,661,682 B2 * | 12/2003 | Kim et al. ..................... 363/59 |
| 6,664,846 B1 * | 12/2003 | Maung et al. ............... 327/536 |
| 6,819,162 B2 * | 11/2004 | Pelliconi ..................... 327/536 |

FOREIGN PATENT DOCUMENTS

JP    2001-343945    12/2001

* cited by examiner

*Primary Examiner*—Jeffrey Sterrett
(74) *Attorney, Agent, or Firm*—Oblon, Spivak, McClelland, Maier & Neustadt, P.C.

(57) ABSTRACT

In order to restrict variations of an output voltage of a DC—DC conversion circuit using TFTs, in a boost-type, a second n-ch TFT N2 and a second p-ch TFT P2 are newly provided. With regard to the second n-ch TFT N2, a gate thereof is connected to a second capacitor C2, a source thereof is connected to a first reference voltage source YVDD, and a drain thereof is connected to a first capacitor C1. With regard to the second p-ch TFT P2, a gate thereof is connected to the second capacitor C2, a source thereof is connected to a third capacitor C3, and a drain thereof is connected to the first capacitor C1. Thus, a voltage at the first capacitor C1 stops being influenced by the variations of a threshold voltage between a source and drain of a first diode D1.

6 Claims, 14 Drawing Sheets

DC-DC CONVERSION CIRCUIT

CROSS-REFERENCE TO RELATED APPLICATIONS

This application is based upon and claims the benefit of priority from Japanese Patent Application No. 2003-382336 filed on Nov. 12, 2003; the entire contents of which are incorporated herein by reference.

BACKGROUND OF THE INVENTION

1. Field of the Invention

The present invention relates to a DC—DC conversion circuit for use in a drive circuit of a liquid crystal display device, and the like, and particularly, to a DC—DC conversion circuit formed by use of thin film transistors using polysilicon as a material.

2. Description of the Related Art

A liquid crystal display device has a configuration in which a liquid crystal layer is held in a gap between a glass-made array substrate and a glass-made opposite substrate arranged opposite to the array substrate, the array substrate including a pixel display unit having pixels arranged on intersections of a plurality of signal lines and a plurality of scan lines.

In recent years, a manufacturing technology for forming thin film transistors (TFTs) using polysilicon as a material on the array substrate has been making a progress, and use of this technology has made it possible to form the pixel display unit and a drive circuit which drives the signal lines and the scan lines on the same array substrate. In this forming technique, the thin film transistors are used for both of transistors arranged on the respective pixels and transistors arranged on the drive circuit, and both of the transistors are formed in the same manufacturing step (for example, refer to Japanese Patent Laid-Open Publication No. 2001-343945).

When driving the liquid crystal, a plurality of drive voltages are required, and the drive circuit requires a DC—DC conversion circuit. Use of the thin film transistors for transistors forming this DC—DC conversion circuit has made it also possible to form the DC—DC conversion circuit on the array substrate.

However, the thin film transistors have had problems that there are large variations in characteristics thereof, causing variations of output voltages of the DC—DC conversion circuit.

SUMMARY OF THE INVENTION

It is an object of the present invention to provide a DC—DC conversion circuit capable of restricting the variations of the output voltages in the case of using the thin film transistors.

A first aspect of the present invention is a DC—DC conversion circuit including: a first reference voltage source; a first capacitor in which a first clock signal source is connected to one end; a second capacitor of which one end is connected to a second clock signal source which outputs an inverted signal of a first clock signal; a third capacitor for outputting a voltage outputted from the first reference voltage source and boosted; a first n-ch thin film transistor of which gate is connected to the other end of the first capacitor, source is connected to the first reference voltage source, and drain is connected to the other end of the second capacitor; a first p-ch thin film transistor of which gate is connected to the other end of the first capacitor, source is connected to the third capacitor, and drain is connected to the other end of the second capacitor; a first diode connected in a forward direction from the other end of the first capacitor toward the first reference voltage source; a second n-ch thin film transistor of which gate is connected to the other end of the second capacitor, source is connected to the first reference voltage source, and drain is connected to the other end of the first capacitor; and a second p-ch thin film transistor of which gate is connected to the other end of the second capacitor, source is connected to the third capacitor, and drain is connected to the other end of the first capacitor.

In the present invention, the second n-ch TFT and the second p-ch TFT are newly provided in the boost-type DC—DC conversion circuit. To put it concretely, with regard to the second n-ch TFT, the gate thereof is connected to the other end of the second capacitor, the source thereof is connected to the first reference voltage source, and the drain thereof is connected to the other end of the first capacitor. Moreover, with regard to the second p-ch TFT, the gate thereof is connected to the other end of the second capacitor, the source thereof is connected to the third capacitor, and the drain thereof is connected to the other end of the first capacitor. With this configuration, the voltage at the other end of the first capacitor stops being influenced by the variations of the threshold voltage between the source and drain of the first diode. Therefore, the first n-ch TFT or the first p-ch TFT, of which gate is connected to the first capacitor, can be turned off completely, and the leak current due to these thin film transistors can be restricted. Thus, the variations of the inter-terminal voltage of the third capacitor, that is, the variations of the output voltage of this circuit can be restricted.

A second aspect of the present invention is a DC—DC conversion circuit including: a second reference voltage source; a fourth capacitor in which a third clock signal source is connected to one end; a fifth capacitor of which one end is connected to a fourth clock signal source which outputs an inverted signal of a third clock signal; a sixth capacitor for outputting a voltage outputted from the second reference voltage source and dropped; a third p-ch thin film transistor of which gate is connected to the other end of the fourth capacitor, source is connected to the second reference voltage source, and drain is connected to the other end of the fifth capacitor; a third n-ch thin film transistor of which gate is connected to the other end of the fourth capacitor, source is connected to the sixth capacitor, and drain is connected to the other end of the fifth capacitor; a second diode connected in a forward direction from the other end of the fourth capacitor toward the second reference voltage source; a fourth p-ch thin film transistor of which gate is connected to the other end of the fifth capacitor, source is connected to the second reference voltage source, and drain is connected to the other end of the fourth capacitor; and a fourth n-ch thin film transistor of which gate is connected to the other end of the fifth capacitor, source is connected to the sixth capacitor, and drain is connected to the other end of the fourth capacitor.

In the present invention, the fourth n-ch TFT and the fourth p-ch TFT are newly provided in the step-down DC—DC conversion circuit. To put it concretely, with regard to the fourth n-ch TFT, the gate thereof is connected to the other end of the fifth capacitor, the source thereof is connected to the sixth capacitor, and the drain thereof is connected to the other end of the fourth capacitor. Moreover, with regard to the fourth p-ch TFT, the gate thereof is connected to the other end of the fifth capacitor, the source thereof is connected to the second reference voltage source, and the drain thereof is connected to the other end of the fourth capacitor. With this configuration, the voltage at the other end of the fourth capacitor stops being influenced by the threshold voltage between the source and drain of the second diode. Therefore, the third p-ch TFT or the third n-ch TFT, of which gate is connected to the other end of the fourth capacitor, can be turned off completely, and the leak current due to these thin film transistors can be restricted. Thus, the variations of the inter-terminal voltage of the sixth capacitor, that is, the variations of the output voltage of this circuit can be restricted.

DESCRIPTION OF THE EMBODIMENT

First Embodiment

Figure 1:
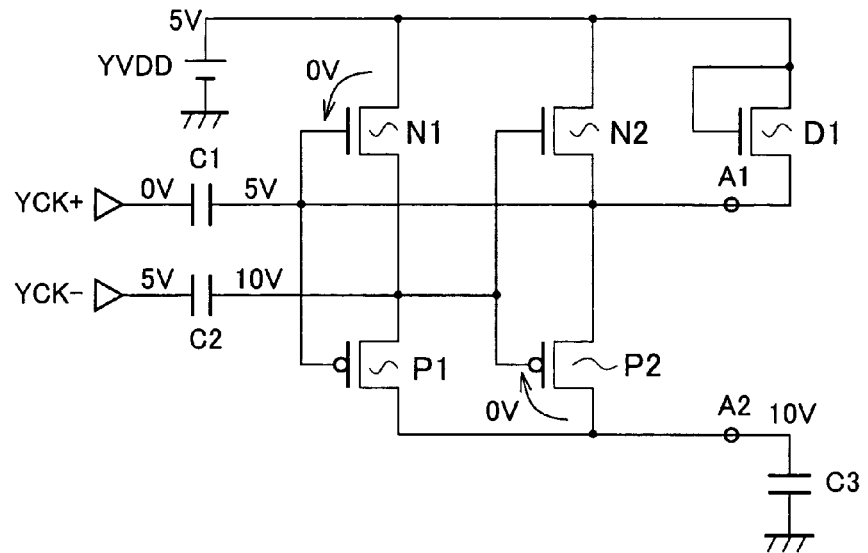
FIG. 1 shows a circuit diagram of a DC—DC conversion circuit in a first embodiment.

In this embodiment, a boost-type DC—DC conversion circuit which boosts and outputs an input voltage is described. As shown in the circuit diagram of FIG. 1, this DC—DC conversion circuit is configured by including a first reference voltage source YVDD, a first capacitor C1, a second capacitor C2, a third capacitor C3, a first n-channel thin film transistor (n-ch TFT) N1, a first p-channel thin film transistor (p-ch TFT) P1, a second n-ch TFT N2, a second p-ch TFT P2, and a first diode D1.

All of the first n-ch TFT N1, the first p-ch TFT P1, the second n-ch TFT N2 and the second p-ch TFT P2 are MOS thin film transistors using polysilicon as materials. The first diode D1 is formed by connecting a gate and source of a MOS n-ch TFT using polysilicon as a material to each other.

The first reference voltage source YVDD is a voltage source which outputs a direct voltage (5V), and this direct voltage is an input voltage of this DC—DC conversion circuit. One end of the first capacitor C1 is connected to a first clock signal source, and one end of the second capacitor C2 is connected to a second clock signal source. The first clock signal source outputs a first clock signal YCK+, and the second clock signal source outputs a second clock signal YCK− formed by inverting the first clock signal YCK+. The third capacitor C3 is one for outputting a voltage outputted from the first reference voltage source YVDD and boosted by this circuit, and an inter-terminal voltage (10V) thereof becomes an output voltage of this DC—DC conversion circuit.

With regard to the first n-ch TFT N1, a gate thereof is connected to the other end of the first capacitor C1, a source thereof is connected to the first reference voltage source YVDD, and a drain thereof is connected to the other end of the second capacitor C2.

With regard to the first p-ch TFT P1, a gate thereof is connected to the other end of the first capacitor C1, a source thereof is connected to one end of the third capacitor C3, and a drain thereof is connected to the other end of the second capacitor C2.

The first diode D1 is connected in a forward direction from the other end of the first capacitor C1 toward the first reference voltage source YVDD.

With regard to the second n-ch TFT N2, a gate thereof is connected to the other end of the second capacitor C2, a source thereof is connected to the first reference voltage source YVDD, and a drain thereof is connected to the other end of the first capacitor C1.

With regard to the second p-ch TFT P2, a gate thereof is connected to the other end of the second capacitor C2, a source thereof is connected to the one end of the third capacitor C3, and a drain thereof is connected to the other end of the first capacitor C1.

Figure 2:
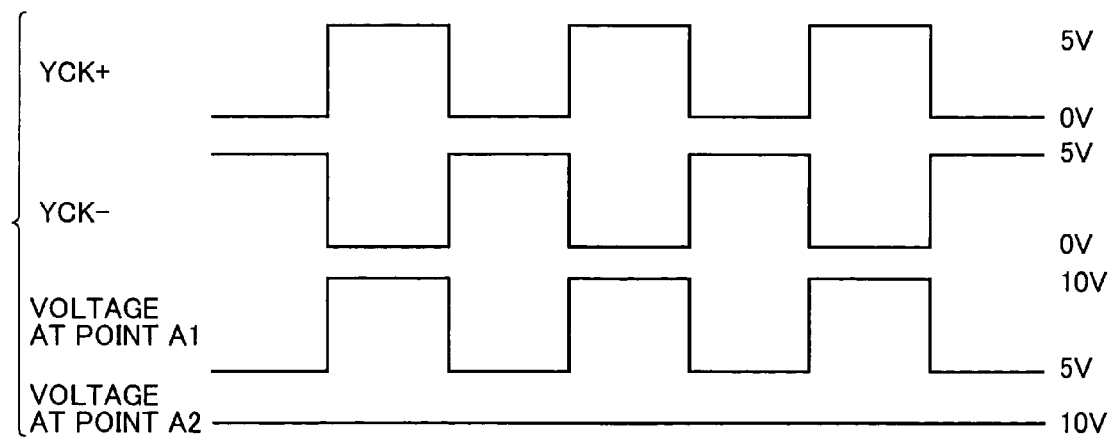
FIG. 2 shows voltage waveforms in the circuit diagram of FIG. 1.

As shown in voltage waveforms of FIG. 2, the first clock signal YCK+ and the second clock signal YCK− are in an inverse relationship. An on/off duty ratio of each of the first clock signal YCK+ and the second clock signal YCK− is 50%. A voltage at a point A1 is a voltage at the other end of the first capacitor C1, and a voltage at a point A2 is the inter-terminal voltage of the third capacitor C3.

Next, an operation when the first clock signal YCK+ is at a low potential (0V) and the second clock signal YCK− is at a high potential (5V) is described with reference to FIG. 3.

The first capacitor C1 is charged to raise an output thereof to 5V, and the first n-ch TFT N1, of which gate is connected to the first capacitor C1, turns off. The first p-ch TFT P1, of which gate is connected to the first capacitor C1 too, turns on. Thus, a current Id1 flows from the second capacitor C2 toward the third capacitor C3 through the first p-ch TFT P1.

Moreover, the second capacitor C2 is also charged to raise an output thereof to 10V, and the second n-ch TFT N2, of which gate is connected to the second capacitor C2, turns on. The second p-ch TFT P2, of which gate is connected to the second capacitor C2 too, turns off. Thus, a current Id3 flows from the first reference voltage source YVDD toward the first capacitor C1 through the second n-ch TFT N1.

In this DC—DC conversion circuit, the second n-ch TFT N2 and the second p-ch TFT P2 are operated in such a way, and thus the voltage at the point A1 is restricted from being affected by a threshold voltage −Vthn between the source and drain of the first diode D1. Thus, the first n-ch TFT N1 in which the voltage at the point A1 is applied to the gate is completely turned off, and a leak current is not allowed to flow through the n-ch TFT N1. Accordingly, the variations of an output voltage of this DC—DC conversion circuit at the point A2 can be restricted.

Subsequently, an operation when the first clock signal YCK+ is at the high potential (5V) and the second clock signal YCK− is at the low potential (0V) is described with reference to FIG. 4.

The first capacitor C1 is charged to raise the output thereof to 10V, and the first n-ch TFT N1 and the first p-ch TFT P1, of which gates are connected to the first capacitor C1, turn on and off, respectively. Thus, a current Id2 flows from the first reference voltage source YVDD toward the second capacitor C2 through the first n-ch TFT N1.

Moreover, the second capacitor C2 is also charged to raise the output thereof to 5V, and the second n-ch TFT N2 and the second p-ch TFT P2, of which gates are connected to the second capacitor C2, turn off and on, respectively. Thus, a current Id4 flows from the first capacitor C1 toward the third capacitor C3 through the second p-ch TFT P2.

In this DC—DC conversion circuit, the second n-ch TFT N2 and the second p-ch TFT P2 are operated in such a way, and thus the voltage at the point A1 is restricted from being affected by the threshold voltage −Vthn between the source and drain of the first diode D1. Moreover, the first p-ch TFT P1 in which the voltage at the point A1 is applied to the gate is completely turned off, and a leak current is not allowed to flow through the p-ch TFT P1. Accordingly, the variations of the output voltage of this DC—DC conversion circuit at the point A2 can be restricted.

Subsequently, a circuit simulation which was performed for confirming a state of the variations of the output voltage in this DC—DC conversion circuit is described. Conditions of the simulation were set as follows: capacitances of the first capacitor C1 and the second capacitor C2: 0.08 „F; a capacitance of the third capacitor C3: 1 „F; a frequency: 16.7 kHz; a width (W)/length (L) of each of the TFTs N1 and P1: 4000 „m/4.5 „m; an electron mobility: 100 cm$^2$/Vs; and a width (W)/length (L) of each of the TFTs N2 and P2: 5 „m/4.5 „m.

Figure 5:
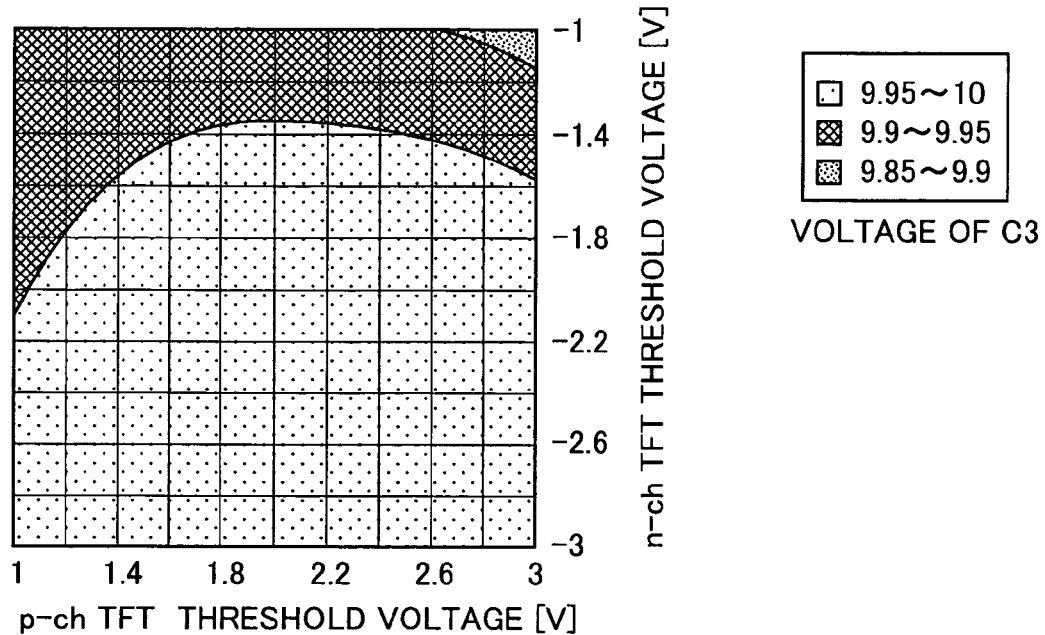
FIG. 5 shows dependency characteristics of an inter-terminal voltage of a third capacitor C3 on variations of respective thin film transistors in the circuit diagram of FIG. 1.

FIG. 5 is a graph showing a distribution of the variations of the inter-terminal voltage of the third capacitor C3 when a threshold voltage of the p-ch TFT varies in a range of 1 to 3V and a threshold voltage of the n-ch TFT varies in a range of −1 to −3V. As shown in this graph, it was confirmed that the variations of the inter-terminal voltage of the third capacitor C3 could be controlled within a narrow range of 9.85 to 10V even if the threshold voltages of the respective thin film transistors varied.

Next, a DC—DC conversion circuit of comparative example 1 is described. As shown in circuit diagrams of FIGS. 6 and 7, the DC—DC conversion circuit of comparative example 1 has a configuration in which the second n-ch TFT N2 and the second p-ch TFT P2 are removed from the circuit of FIG. 1. Other portions are similar to those of the circuit of FIG. 1, and the same reference numerals are added to the same components as those in FIG. 1, and duplicate description is omitted here.

Figure 6:
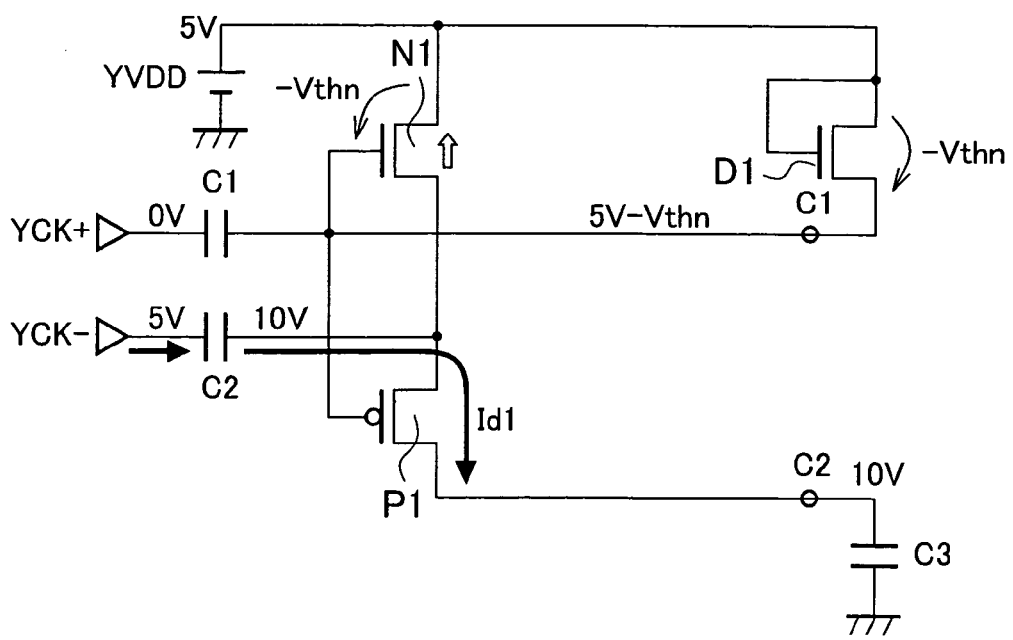
FIG. 6 shows a current flow in a DC—DC conversion circuit of comparative example 1 when the first clock signal YCK+ is at the low potential and the second clock signal YCK− is at the high potential.

As shown in FIG. 6, when the first clock signal YCK+ is at the low potential (0V) and the second clock signal YCK− is at the high potential (5V), the first n-ch TFT N1 turns off, and the first p-ch TFT P1 turns on. In this case, a voltage at a point C1, which is a voltage of the other end of the first capacitor C1, is affected by the threshold voltage (−Vthn) of the first diode D1, and becomes 5V−Vthn. For this reason, the first n-ch TFT N1 does not turn off completely depending on the variations of the threshold voltage, and a leak current flows through the n-ch TFT N1 to vary the current Id1 toward the third capacitor C3, thus increasing the variations of the inter-terminal voltage of the third capacitor C3.

Figure 7:
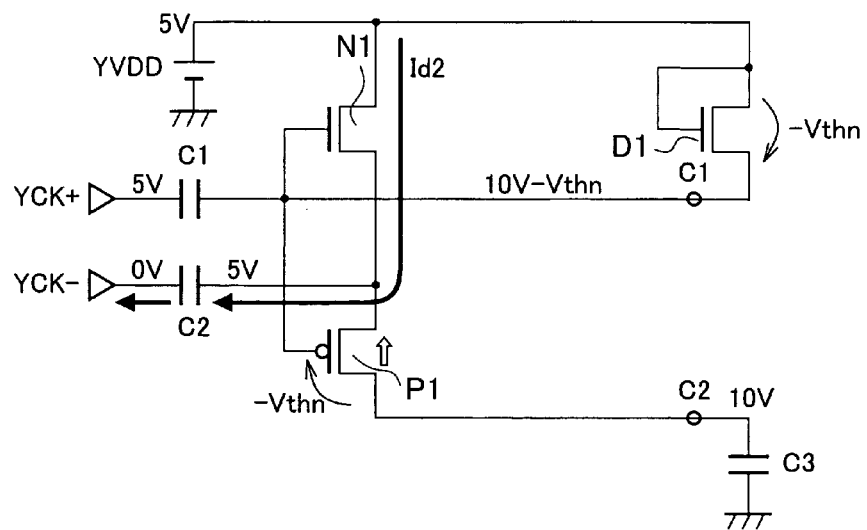
FIG. 7 shows a current flow in the DC—DC conversion circuit of comparative example 1 when the first clock signal YCK+ is at the high potential and the second clock signal YCK− is at the low potential.
Figure 8:
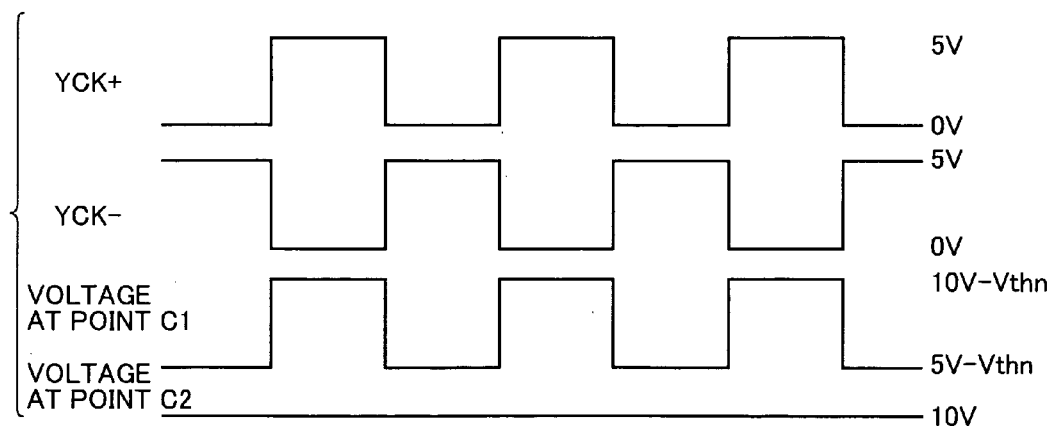
FIG. 8 shows voltage waveforms of respective portions in the DC—DC conversion circuit of comparative example 1.

Moreover, as shown in FIG. 7, when the first clock signal YCK+ is at the high potential (5V) and the second clock signal YCK− is at the low potential (0V), the first n-ch TFT N1 turns on, and the first p-ch TFT P1 turns off. In this case, the voltage at the point C1 is affected by the threshold voltage (−Vthn) of the first diode D1, and becomes 10V−Vthn. For this reason, the first p-ch TFT P1 does not turn off completely, and a leak current flowing through the p-ch TFT P1 is increased, thus increasing the variations of the inter-terminal voltage of the third capacitor C3.

Figure 9:
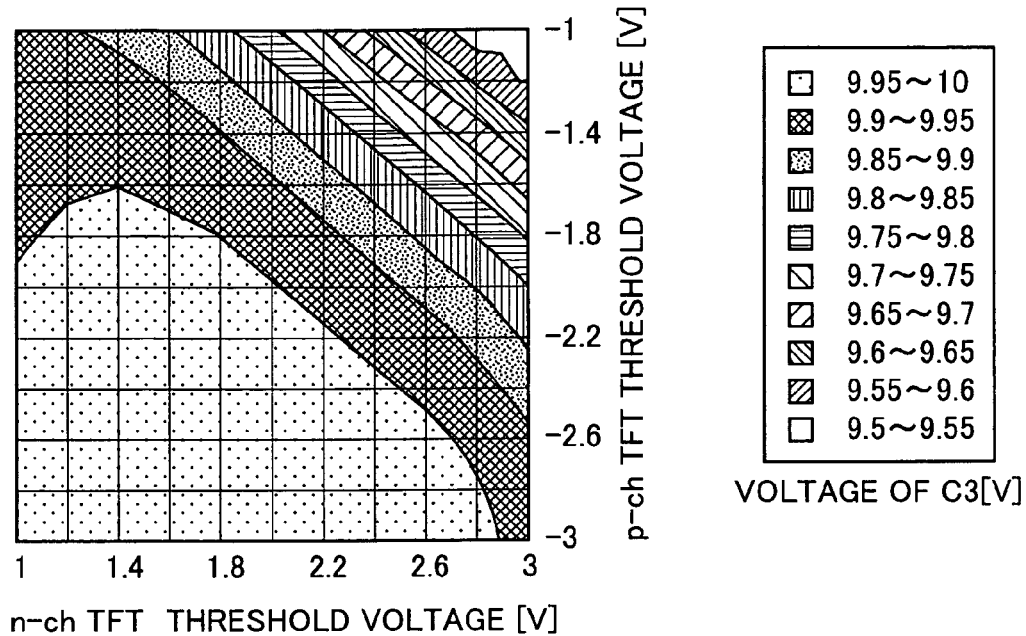
FIG. 9 shows dependency characteristics of an inter-terminal voltage of a sixth capacitor C6 on variations of respective thin film transistors in the DC—DC conversion circuit of comparative example 1.

A simulation was executed for the DC—DC conversion circuit of comparative example 1 under the same conditions as those for the DC—DC conversion circuit of this embodiment. Then, as shown in FIG. 9, the inter-terminal voltage of the third capacitor C3 ranged widely from 9.5 to 10V. Although the following is anticipated also from the principle of operation of this conversion circuit, FIG. 9 shows that a drop phenomenon of the inter-terminal voltage of the third capacitor C3 is prominent in a range where the threshold voltage Vthn of the n-ch TFT is larger than an absolute value |−Vthp| of the threshold voltage of the p-ch TFT.

As described above, in this embodiment, the second n-ch TFT N2 and the second p-ch TFT P2 are newly provided in the boost-type DC—DC conversion circuit. Specifically, with regard to the second n-ch TFT N2, the gate thereof is connected to the other end of the second capacitor C2, the source thereof is connected to the first reference voltage source YVDD, and the drain thereof is connected to the other end of the first capacitor C1. Moreover, with regard to the second p-ch TFT P2, the gate thereof is connected to the other end of the second capacitor C2, the source thereof is connected to the third capacitor C3, and the drain thereof is connected to the other end of the first capacitor C1. With this configuration, the voltage at the other end of the first capacitor C1 stops being influenced by the variations of the threshold voltage between the source and drain of the first diode D1. Therefore, the first n-ch TFT N1 or the first p-ch TFT P1, of which gate is connected to the first capacitor C1, can be turned off completely, and the leak current due to these thin film transistors can be restricted. Thus, the variations of the inter-terminal voltage of the third capacitor C3, that is, the variations of the output voltage of this circuit can be restricted.

Figure 3:
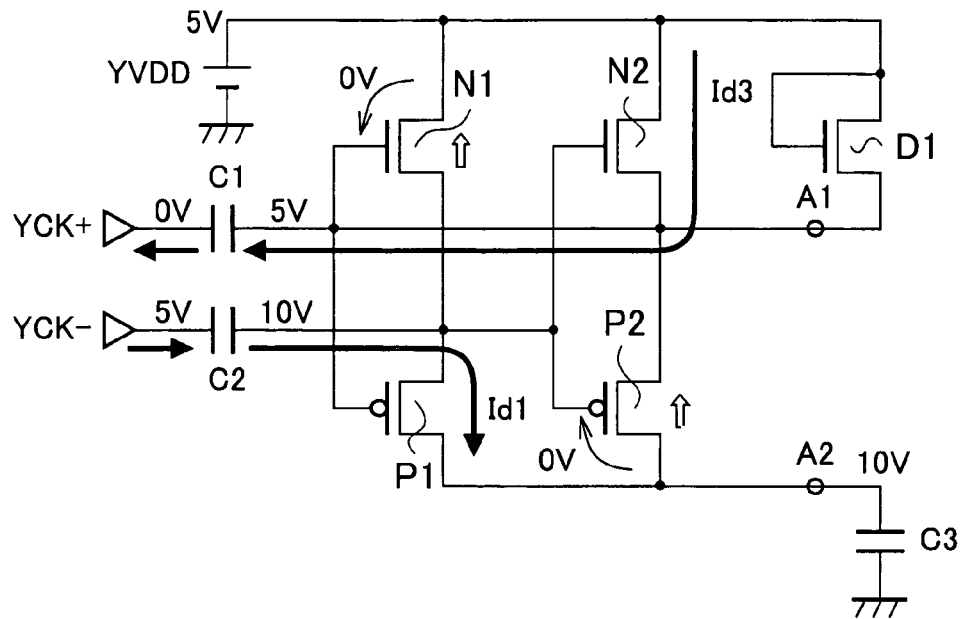
FIG. 3 shows current flows in the circuit diagram of FIG. 1 when a first clock signal YCK+ is at a low potential and a second clock signal YCK− is at a high potential.
Figure 4:
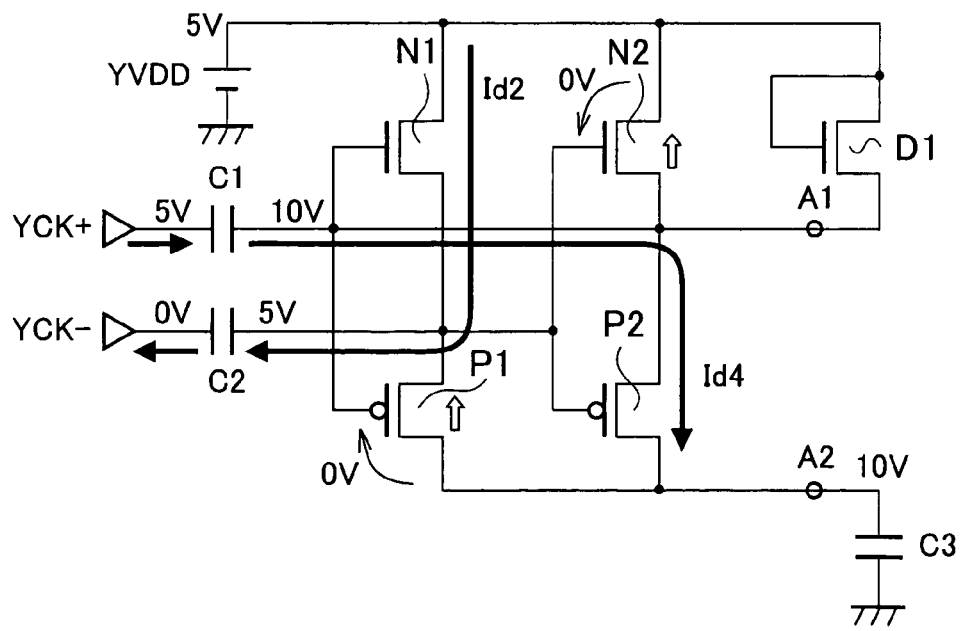
FIG. 4 shows current flows in the circuit diagram of FIG. 1 when the first clock signal YCK+ is at the high potential and the second clock signal YCK− is at the low potential.

In this embodiment, as shown in FIGS. 3 and 4, in both of the cases where the first clock signal YCK+ is set at the low potential and the second clock signal YCK− is set at the high potential and where the first clock signal YCK+ is set at the high potential and the second clock signal YCK− is set at the low potential, the current flows toward the third capacitor C3. In this DC—DC conversion circuit, the on/off duty ratio of each of the first clock signal YCK+ and the second clock signal YCK− is set at 50%, and thus the current flows evenly through the third capacitor C3 in both of the cases. Therefore, the variations of the inter-terminal voltage of the third capacitor C3 can be further restricted.

Second Embodiment

Figure 10:
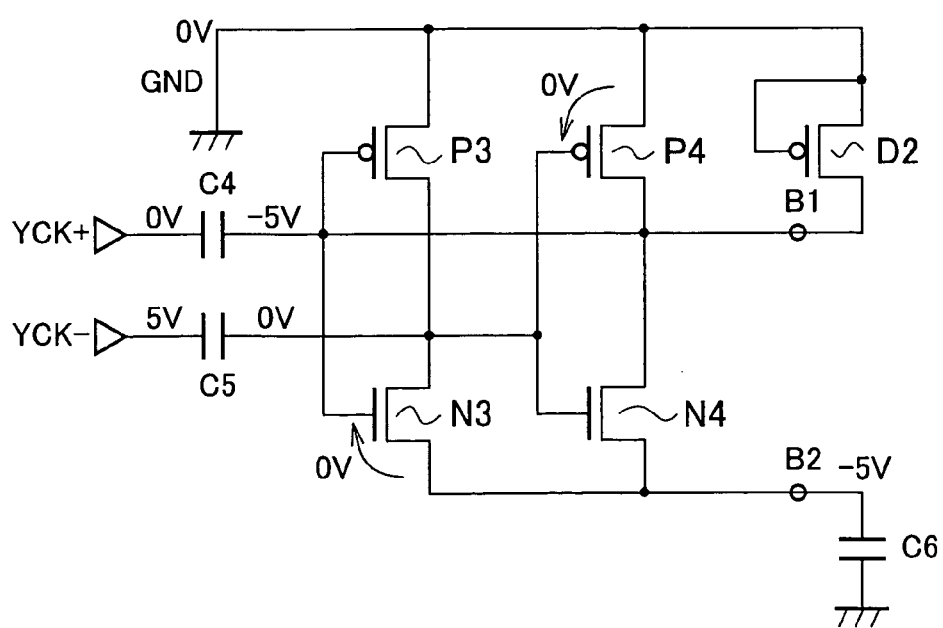
FIG. 10 shows a circuit diagram of a DC—DC conversion circuit in a second embodiment.

In this embodiment, a step-down DC—DC conversion circuit which drops and outputs an input voltage is described. As shown in a circuit diagram of FIG. 10, this DC—DC conversion circuit is configured by including a second reference voltage source GND, a fourth capacitor C4, a fifth capacitor C5, a sixth capacitor C6, a third p-ch TFT P3, a third n-ch TFT N3, a fourth p-ch TFT P4, a fourth n-ch TFT N4, and a second diode D2.

All of the third p-ch TFT P3, the third n-ch TFT N3, the fourth p-ch TFT P4 and the fourth n-ch TFT N4 are MOS thin film transistors using polysilicon as materials. The second diode D2 is formed by connecting a gate and source of a MOS p-ch TFT using polysilicon as a material to each other.

The second reference voltage source GND is a voltage source which outputs a direct voltage (0V), and this direct voltage is an input voltage of this DC—DC conversion circuit. One end of the fourth capacitor C4 is connected to a third clock signal source, and one end of the fifth capacitor C5 is connected to a fourth clock signal source. The third clock signal source outputs a third clock signal YCK+, and the fourth clock signal source outputs a fourth clock signal YCK− formed by inverting the third clock signal YCK+.

The sixth capacitor C6 is one for outputting a voltage outputted from the second reference voltage source GND and dropped by this circuit, and an inter-terminal voltage (−5V) thereof becomes an output voltage of this DC—DC conversion circuit.

With regard to the third p-ch TFT P3, a gate thereof is connected to the other end of the fourth capacitor C4, a source thereof is connected to the second reference voltage source GND, and a drain thereof is connected to the other end of the fifth capacitor C5.

With regard to the third n-ch TFT N3, a gate thereof is connected to the other end of the fourth capacitor C4, a source thereof is connected to the sixth capacitor C6, and a drain thereof is connected to the other end of the fifth capacitor C5.

The first diode D2 is connected in a forward direction from the other end of the fourth capacitor C4 toward the second reference voltage source GND.

With regard to the fourth p-ch TFT P4, a gate thereof is connected to the other end of the fifth capacitor C5, a source thereof is connected to the second reference voltage source GND, and a drain thereof is connected to the other end of the fourth capacitor C4.

With regard to the fourth n-ch TFT N4, a gate thereof is connected to the other end of the fifth capacitor C5, a source thereof is connected to the sixth capacitor C6, and a drain thereof is connected to the other end of the fourth capacitor C4.

Figure 11:
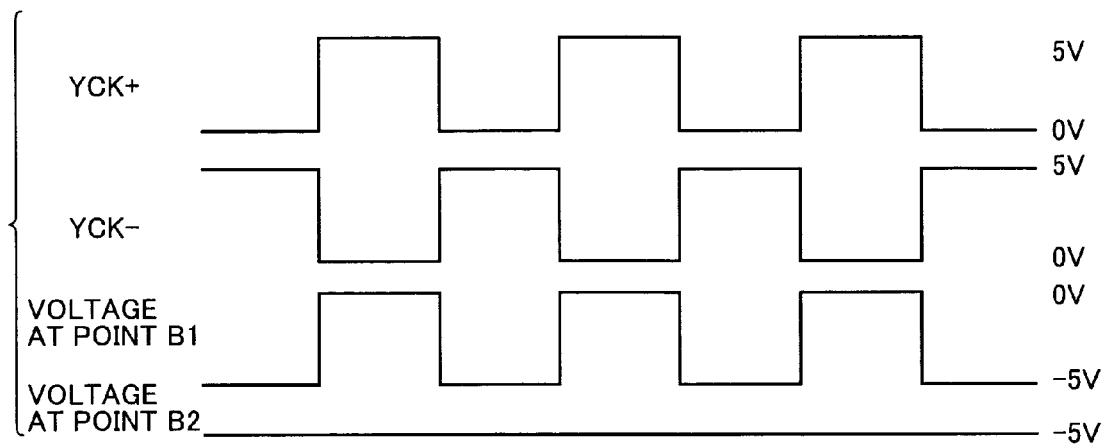
FIG. 11 shows voltage waveforms of respective portions in the circuit diagram of FIG. 10.

FIG. 11 shows voltage waveforms in respective portions of this DC—DC conversion circuit. As shown in FIG. 11, the third clock signal YCK+ and the fourth clock signal YCK− are in an inverse relationship. An on/off duty ratio of each of the third clock signal YCK+ and the fourth clock signal YCK− is 50%. A voltage at a point B1 is a voltage at the other end of the fourth capacitor C4, and a voltage at a point B2 is the inter-terminal voltage of the sixth capacitor C6.

Next, an operation when the third clock signal YCK+ is at a low potential (0V) and the fourth clock signal YCK− is at a high potential (5V) is described with reference to FIG. 12.

An output of the fourth capacitor C4 becomes −5V, and the third p-ch TFT P3 and the third n-ch TFT N3, of which gates are connected to the fourth capacitor C4, turn on and off, respectively. Thus, a current Id5 flows from the fifth capacitor C5 through the third p-ch TFT P3.

Moreover, an output of the fifth capacitor C5 becomes 0V, and the fourth p-ch TFT P4 and the fourth n-ch TFT N4, of which gates are connected to the fifth capacitor C5, turn off and on, respectively. Thus, a current Id7 flows from the sixth capacitor C6 toward the fourth capacitor C4 through the fourth n-ch TFT N4.

In this DC—DC conversion circuit, the fourth n-ch TFT N4 and the fourth p-ch TFT P4 are operated in such a way, and thus the voltage at the point B1 is restricted from being affected by a threshold voltage (−Vthn) between the source and drain of the second diode D2. Therefore, the third n-ch TFT N3 in which the voltage at the point B1 is applied to the gate is completely turned off, and a leak current is not allowed to flow through the n-ch TFT N3, thus the variations of an output voltage of this DC—DC conversion circuit at the point B2 can be restricted.

Subsequently, an operation when the third clock signal YCK+ is at the high potential (5V) and the fourth clock signal YCK− is at the low potential (0V) is described with reference to FIG. 13.

The output of the fourth capacitor C4 becomes 0V, and the third p-ch TFT P3 and the third n-ch TFT N3, of which gates are connected to the fourth capacitor C4, turn off and on, respectively. Thus, a current Id6 flows from the sixth capacitor C6 toward the fifth capacitor C5 through the third n-ch TFT N3.

Moreover, the output of the fifth capacitor C5 becomes −5V, and the fourth p-ch TFT P4 and the fourth n-ch TFT N4, of which gates are connected to the fifth capacitor C5, turn on and off, respectively. Thus, a current Id8 from the fourth capacitor C4 flows through the fourth p-ch TFT P4.

In this DC—DC conversion circuit, the fourth n-ch TFT N4 and the fourth p-ch TFT P4 are operated in such a way, and thus the voltage at the point B1 is restricted from being affected by the threshold voltage (−Vthn) between the source and drain of the second diode D2. Moreover, the third p-ch TFT P3 in which the voltage at the point B1 is applied to the gate is completely turned off, and a leak current is not allowed to flow through the p-ch TFT P3, thus restricting the variations of the output voltage of this DC—DC conversion circuit at the point B2.

Subsequently, a circuit simulation that was performed for confirming a state of the variations of the output voltage in this DC—DC conversion circuit is described. Conditions of the simulation were set as follows: capacitances of the fourth capacitor C4 and the fifth capacitor C5: 0.08 „F; a capacitance of the sixth capacitor C6: 1 „F; a frequency: 16.7 kHz; a width (W)/length (L) of each of the TFTs N3 and P3: 4000 „m/4.5 „m; an electron mobility: 100 cm$^2$/Vs; and a width (W)/length (L) of each of the TFTs N4 and P4: 5 „m/4.5 „m.

Figure 14:
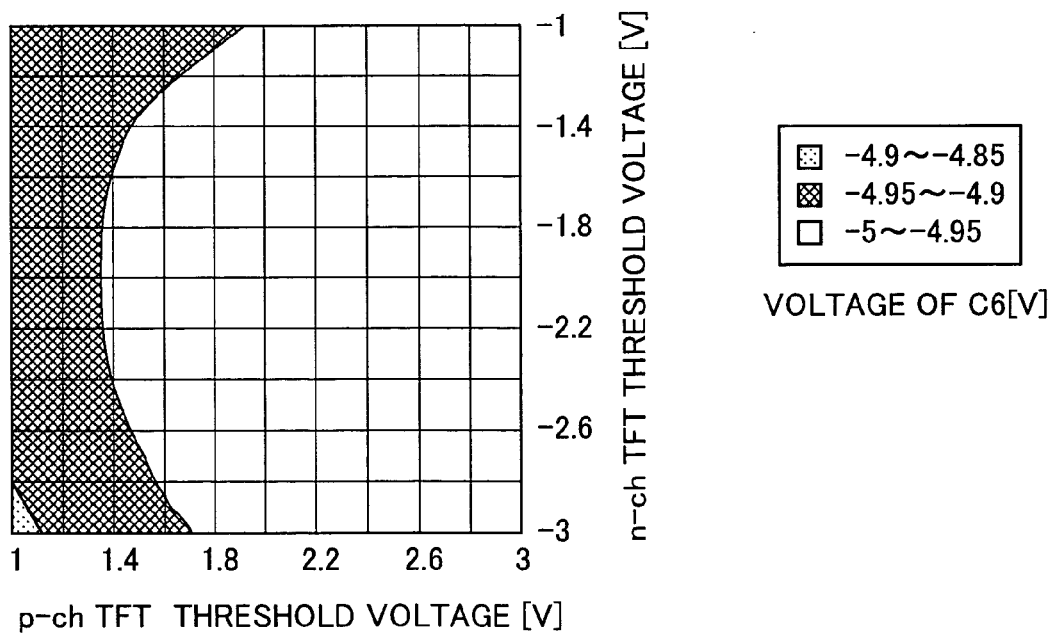
FIG. 14 is a view showing dependency characteristics of an inter-terminal voltage of a sixth capacitor C6 on variations of respective thin film transistors in the circuit diagram of FIG. 10.

FIG. 14 shows a distribution of the variations of the inter-terminal voltage of the sixth capacitor C6 when a threshold voltage of the p-ch TFT varies in a range of 1 to 3V and a threshold voltage of the n-ch TFT varies in a range of −1 to −3V. As shown in FIG. 14, it was confirmed that the variations of the inter-terminal voltage of the sixth capacitor C6 could be controlled within a narrow range of −5 to −4.85V.

Next, a DC—DC conversion circuit of comparative example 2 is described. As shown in circuit diagrams of FIGS. 15 and 16, the DC—DC conversion circuit of comparative example 2 has a configuration in which the fourth n-ch TFT N4 and the fourth p-ch TFT P4 are removed from the circuit of FIG. 10. Other portions are similar to those of the circuit of FIG. 10, and the same reference numerals are added to the same components as those in FIG. 10, and duplicate description is omitted here.

Figure 15:
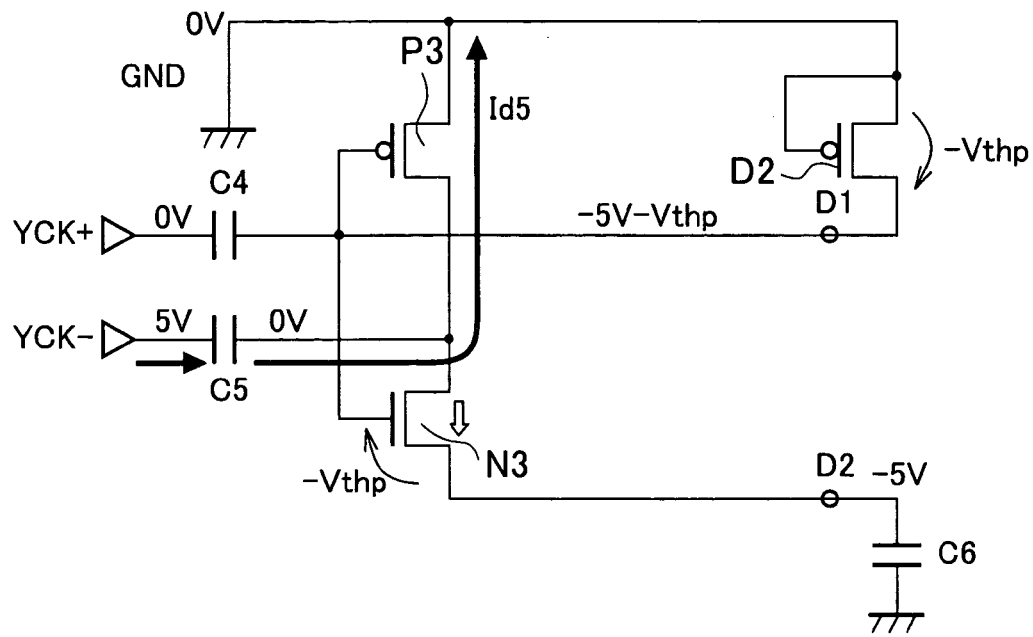
FIG. 15 shows a current flow in a DC—DC conversion circuit of comparative example 2 when the third clock signal YCK+ is at the low potential and the fourth clock signal YCK− is at the high potential.

As shown in FIG. 15, when the third clock signal YCK+ is at the low potential (0V) and the fourth clock signal YCK− is at the high potential (5V), the third p-ch TFT P3 turns on, and the third n-ch TFT N3 turns off. In this case, a voltage at a point D1, which is a voltage of the other end of the fourth capacitor C4, is affected by the threshold voltage (−Vthn) of the second diode D2, and becomes −5V−Vthp. For this reason, the third n-ch TFT N3 does not turn off completely, and a leak current flows through the n-ch TFT N3, thus increasing the variations of the inter-terminal voltage of the sixth capacitor C6.

Figure 16:
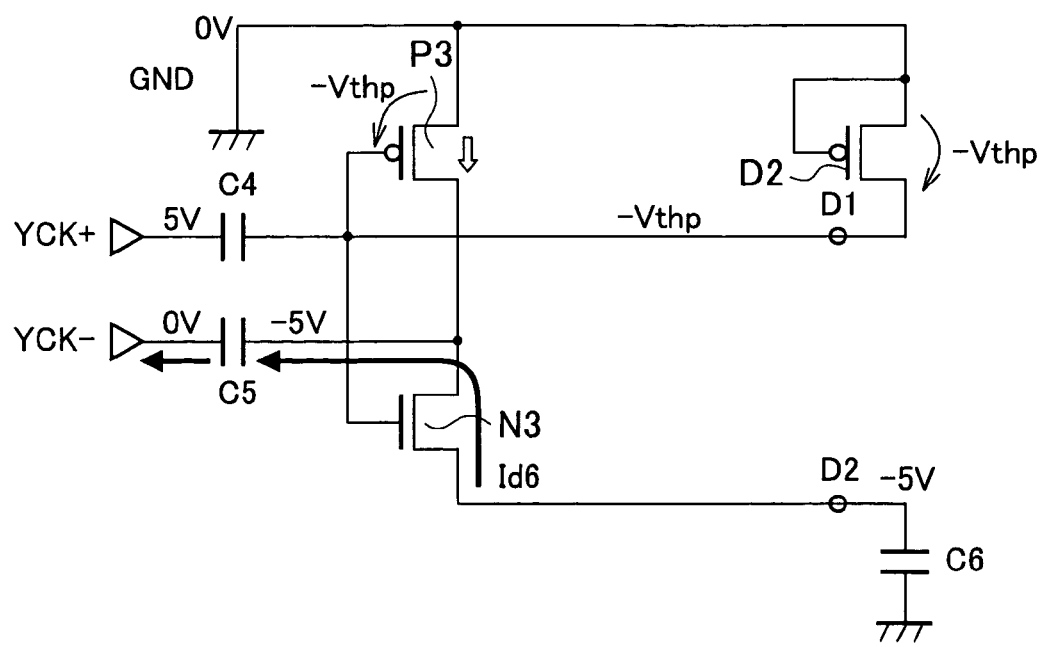
FIG. 16 shows a current flow in the DC—DC conversion circuit of comparative example 2 when the third clock signal YCK+ is at the high potential and the fourth clock signal YCK− is at the low potential.

Moreover, as shown in FIG. 16, when the third clock signal YCK+ is at the high potential (5V) and the fourth clock signal YCK− is at the low potential (0V), the third p-ch TFT P3 turns off, and the third n-ch TFT N3 turns on. In this case, the voltage at the point D1 is affected by the threshold voltage (−Vthn) of the second diode D2, and becomes −Vthp. For this reason, the third p-ch TFT P3 does not turn off completely depending on the variations of the threshold voltage (−Vthp), and a leak current flows through the p-ch TFT P3, thus increasing the variations of the inter-terminal voltage of the sixth capacitor C6.

Figure 17:
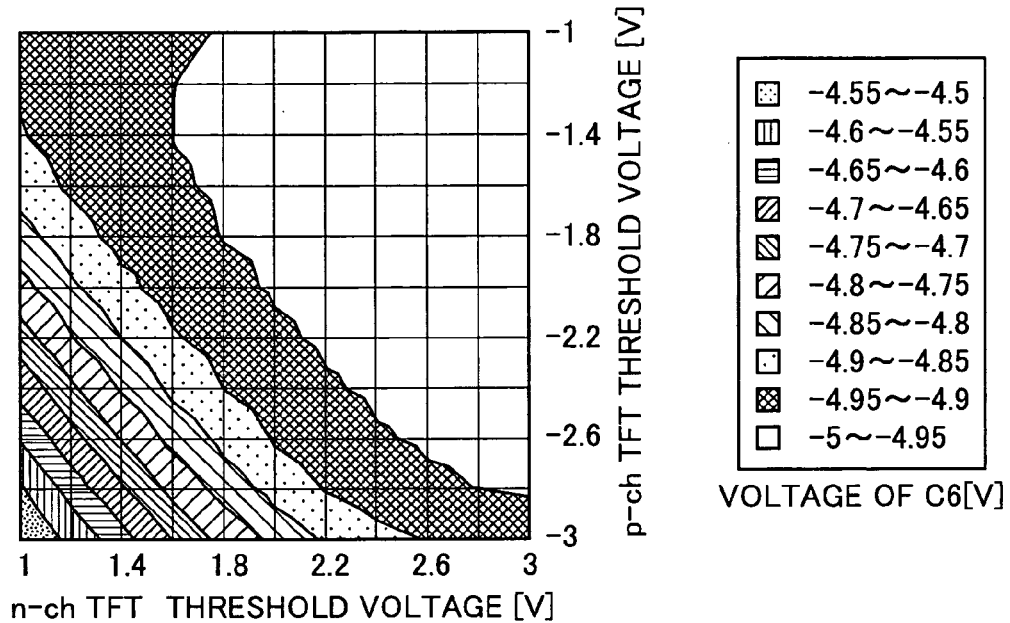
FIG. 17 shows dependency characteristics of an inter-terminal voltage of a sixth capacitor C6 on variations of respective thin film transistors in the DC—DC conversion circuit of comparative example 2.

A simulation was executed for the DC—DC conversion circuit of comparative example 2 under the same conditions as those for the DC—DC conversion circuit of this embodiment. Then, as shown in FIG. 17, the inter-terminal voltage of the sixth capacitor C6 ranged widely from −5 to −4.5V.

As described above, in this embodiment, the fourth n-ch TFT N4 and the fourth p-ch TFT P4 are newly provided in the step-down DC—DC conversion circuit. Specifically, with regard to the fourth n-ch TFT N4, the gate thereof is connected to the other end of the fifth capacitor C5, the source thereof is connected to the sixth capacitor C6, and the drain thereof is connected to the other end of the fourth capacitor C4. Moreover, with regard to the fourth p-ch TFT P4, the gate thereof is connected to the other end of the fifth capacitor C5, the source thereof is connected to the second reference voltage source GND, and the drain thereof is connected to the other end of the fourth capacitor C4. With this configuration, the voltage at the other end of the fourth capacitor C4 stops being influenced by the threshold voltage between the source and drain of the second diode D2. Therefore, the third p-ch TFT P3 or the third n-ch TFT N3, of which gate is connected to the other end of the fourth capacitor C4, can be turned off completely, and the leak current due to these thin film transistors can be restricted. Thus, the variations of the inter-terminal voltage of the sixth capacitor C6, that is, the variations of the output voltage of this circuit can be restricted.

Figure 12:
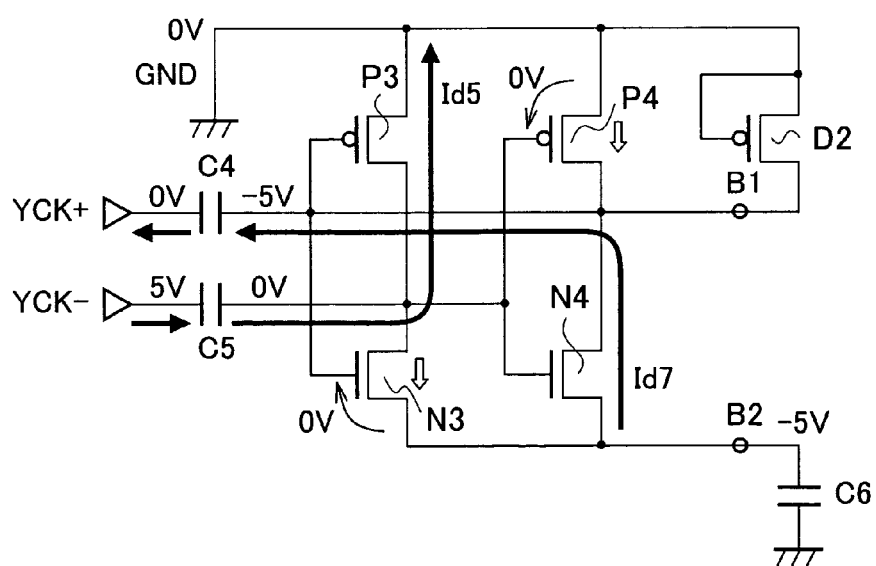
FIG. 12 shows current flows in the circuit diagram of FIG. 10 when a third clock signal YCK+ is at the low potential and a fourth clock signal YCK− is at the high potential.
Figure 13:
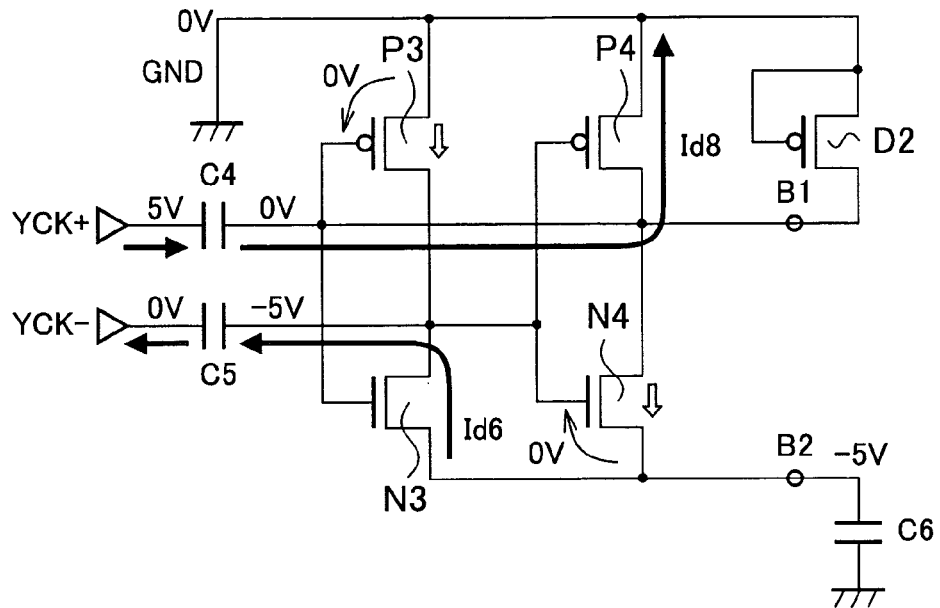
FIG. 13 shows current flows in the circuit diagram of FIG. 10 when the third clock signal YCK+ is at the high potential and the fourth clock signal YCK− is at the low potential.

In this embodiment, as shown in FIGS. 12 and 13, in both of the cases where the third clock signal YCK+ is set at the low potential and the fourth clock signal YCK− is set at the high potential and where the third clock signal YCK+ is set at the high potential and the fourth clock signal YCK− is set at the low potential, the current flows from the sixth capacitor C6. In this DC—DC conversion circuit, the on/off duty ratio of each of the third clock signal YCK+ and the fourth clock signal YCK− is set at 50%, and thus the current flows evenly from the sixth capacitor C6 in both of the cases. Therefore, the variations of the inter-terminal voltage of the sixth capacitor C6 can be further restricted.

Third Embodiment

Figure 18:
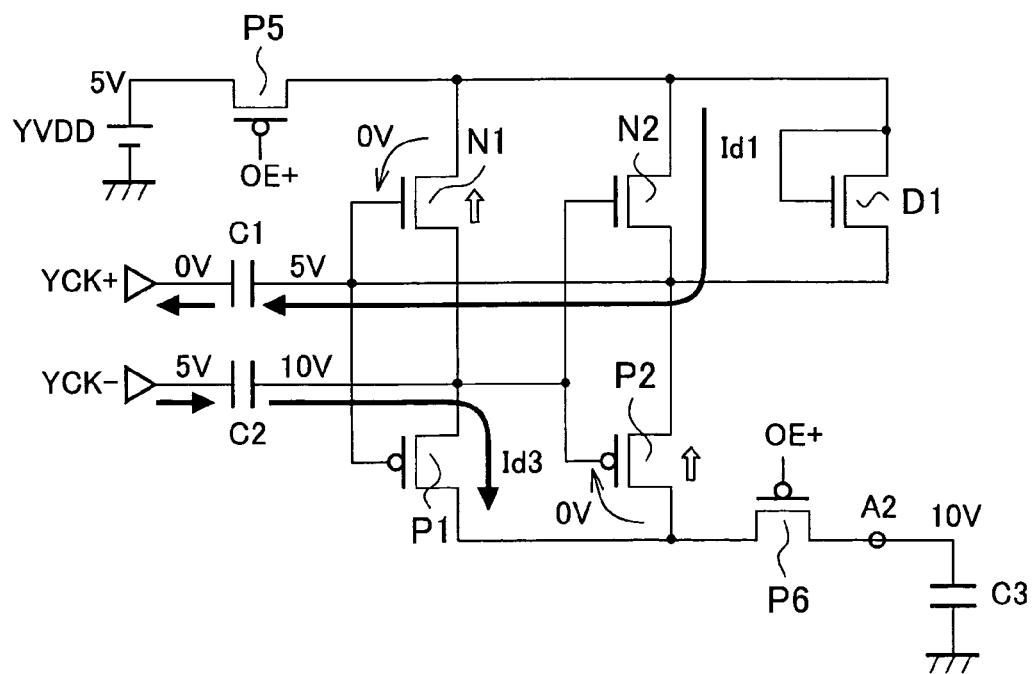
FIG. 18 shows a circuit diagram of a DC—DC conversion circuit in a third embodiment, showing current flows when the first clock signal YCK+ is at the low potential and the second clock signal YCK− is at the high potential.
Figure 19:
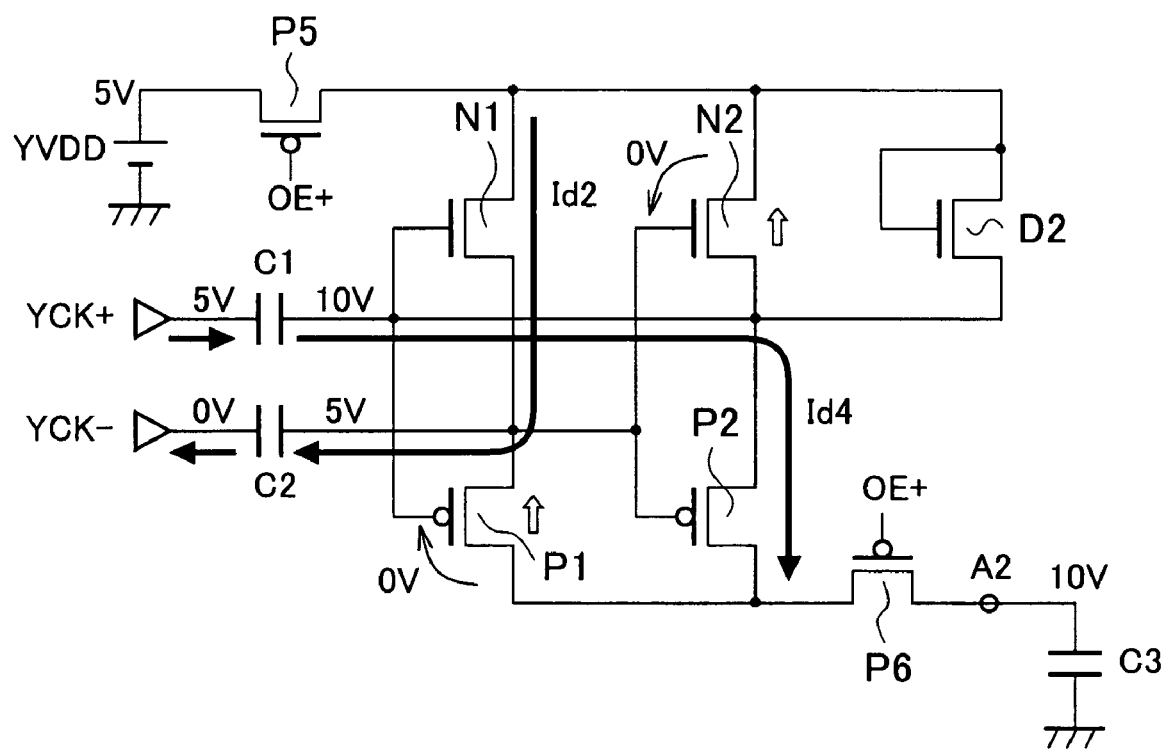
FIG. 19 shows the circuit diagram of the DC—DC conversion circuit in the third embodiment, showing current flows when the first clock signal YCK+ is at the high potential and the second clock signal YCK− is at the low potential.

As shown in circuit diagrams of FIGS. 18 and 19, a boost-type DC—DC conversion circuit in this embodiment has a configuration in which, for the circuit of FIGS. 3 and 4, a switching element P5 is connected to an output stage of the first reference voltage source YVDD, and a switching element P6 is connected to an input stage of the third capacitor C3. As an example, a MOS p-ch TFT using polysilicon as a material is used for each of the switching elements P5 and P6. An enable signal OE+ is supplied to each of the switching elements P5 and P6. Other portions are similar to those of the first embodiment, and accordingly, the same reference numerals are added to the same components as those in FIGS. 3 and 4, and duplicate description is omitted here.

Figure 20:
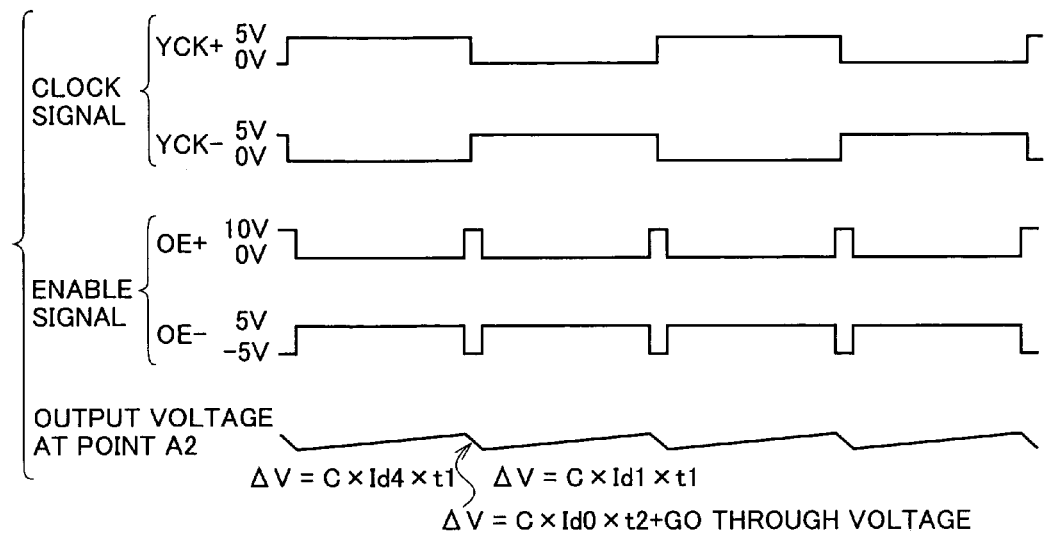
FIG. 20 shows voltage waveforms of respective portions of the DC—DC conversion circuit in the third embodiment.

Leak currents flow through the first n-ch TFT N1 and the first p-ch TFT P1 when the first clock signal YCK+ and the second clock signal YCK− are individually inverted. Accordingly, in this embodiment, as shown in voltage waveforms of FIG. 20, the enable signal OE+ is set at a high potential to turn off both of the switching elements P5 and P6 during periods from immediately before the first clock signal YCK+ and the second clock signal YCK− are inverted to immediately thereafter.

Hence, according to this embodiment, during the periods from immediately before the first clock signal YCK+ and the second clock signal YCK− are inverted to immediately thereafter, the switching elements P5 and P6 are turned off, and thus currents are not allowed to flow through the first n-ch TFT N1 and the first p-ch TFT P1, and accordingly, the leak currents in these thin film transistors can be prevented from occurring.

Figure 21:
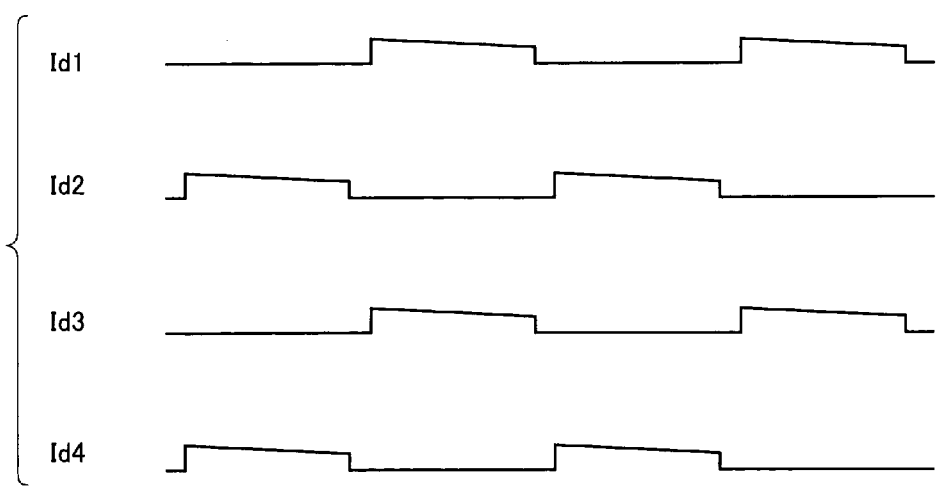
FIG. 21 shows current waveforms of respective portions of the DC—DC conversion circuit in the third embodiment.
Figure 22:
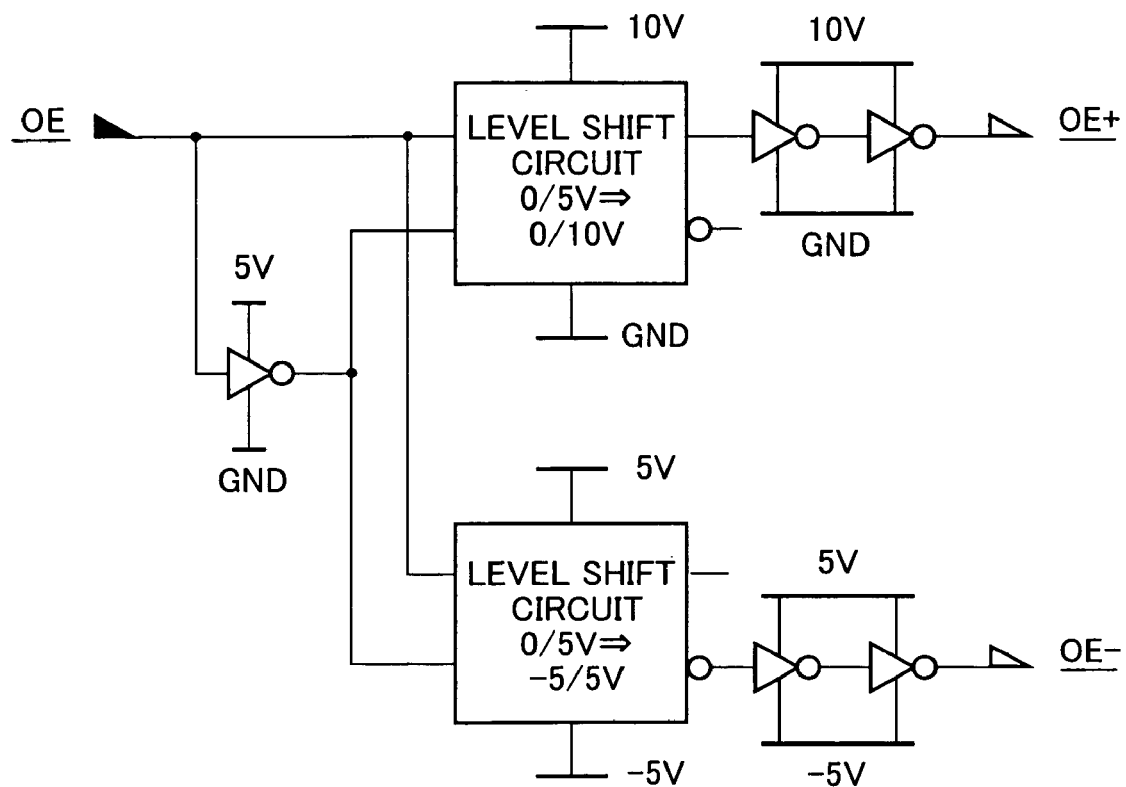
FIG. 22 shows a configuration of a circuit which creates an enable signal OE.

Note that waveforms of respective currents Id1 to Id4 in FIGS. 18 and 19 are shown in FIG. 21, and a configuration of a circuit that creates the enable signal OE+ is shown in FIG. 22.

Fourth Embodiment

Figure 23:
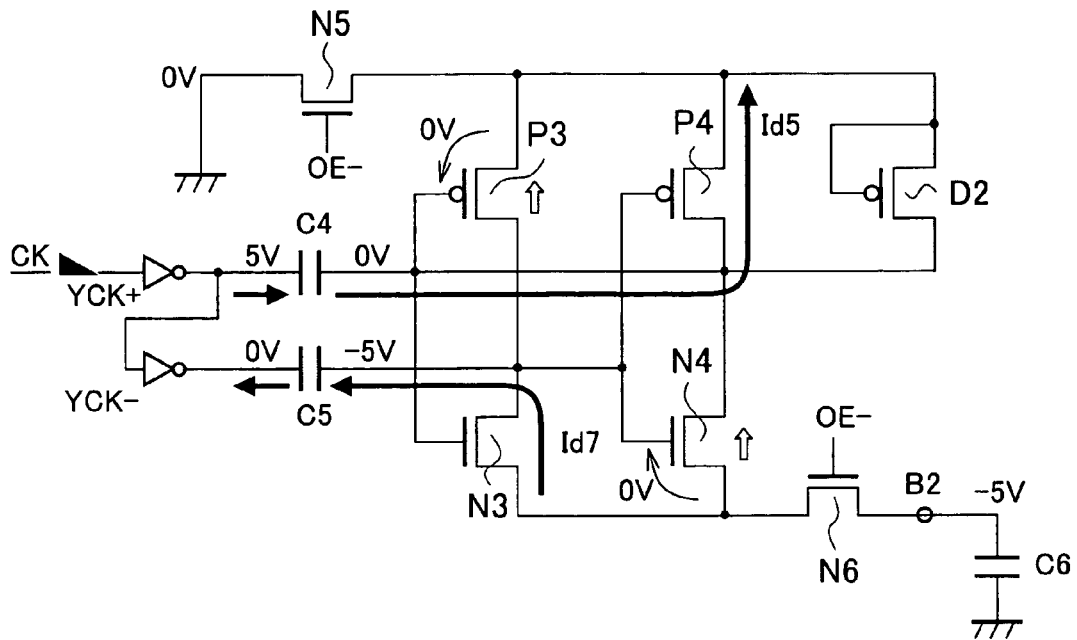
FIG. 23 shows a circuit diagram of a DC—DC conversion circuit in a fourth embodiment, showing current flows when the third clock signal YCK+ is at the low potential and the fourth clock signal YCK− is at the high potential.
Figure 24:
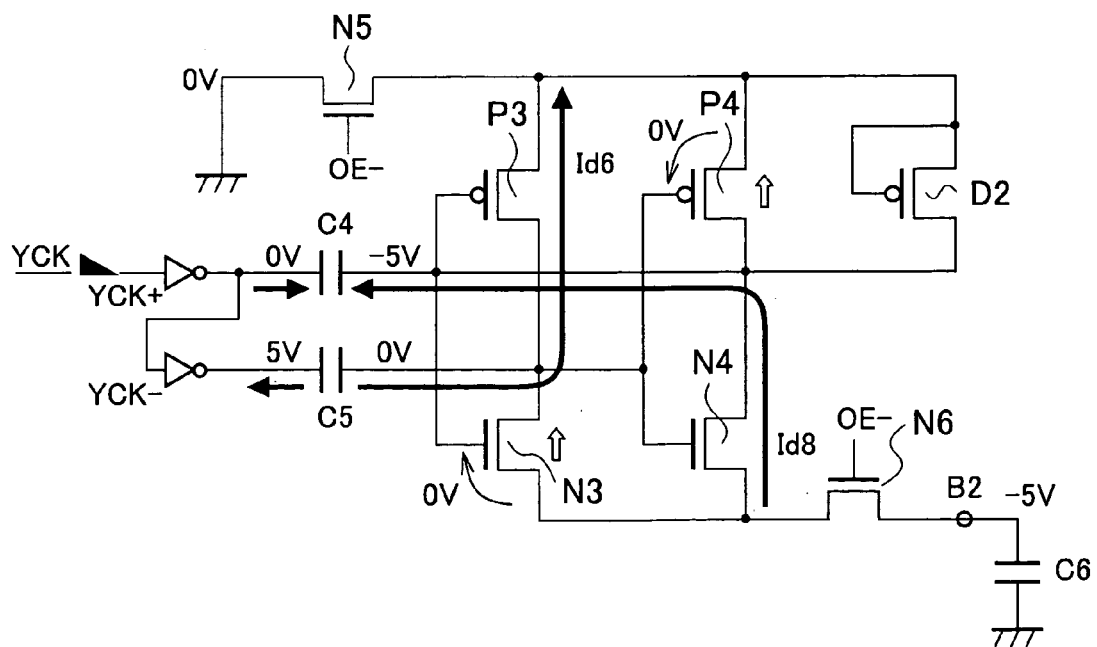
FIG. 24 shows a circuit diagram of the DC—DC conversion circuit in the fourth embodiment, showing current flows when the third clock signal YCK+ is at the high potential and the fourth clock signal YCK− is at the low potential.

As shown in circuit diagrams of FIGS. 23 and 24, a step-down DC—DC conversion circuit in this embodiment has a configuration in which, for the circuit of FIGS. 12 and 13, a switching element N5 is connected to an output stage of the second reference voltage source GND, and a switching element N6 is connected to an input stage of the sixth capacitor C6. As an example, a MOS n-ch TFT using polysilicon as a material is used for each of the switching elements N5 and N6. An enable signal OE− is supplied to each of the switching elements N5 and N6. Other portions are similar to those of the second embodiment, and accordingly, the same reference numerals are added to the same components as those in FIGS. 12 and 13, and duplicate description is omitted here.

Figure 25:
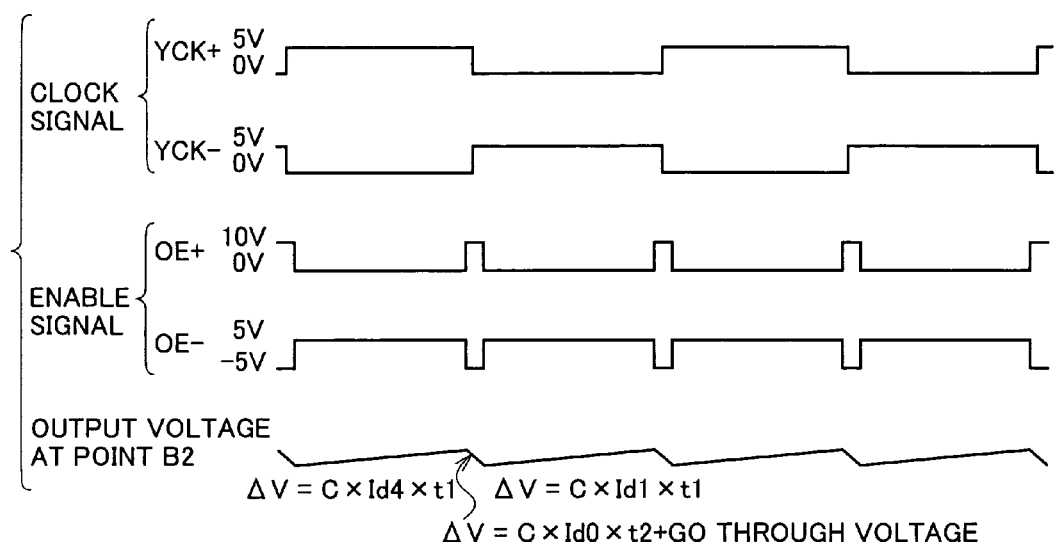
FIG. 25 shows voltage waveforms of respective portions of the DC—DC conversion circuit in the fourth embodiment.
Figure 26:
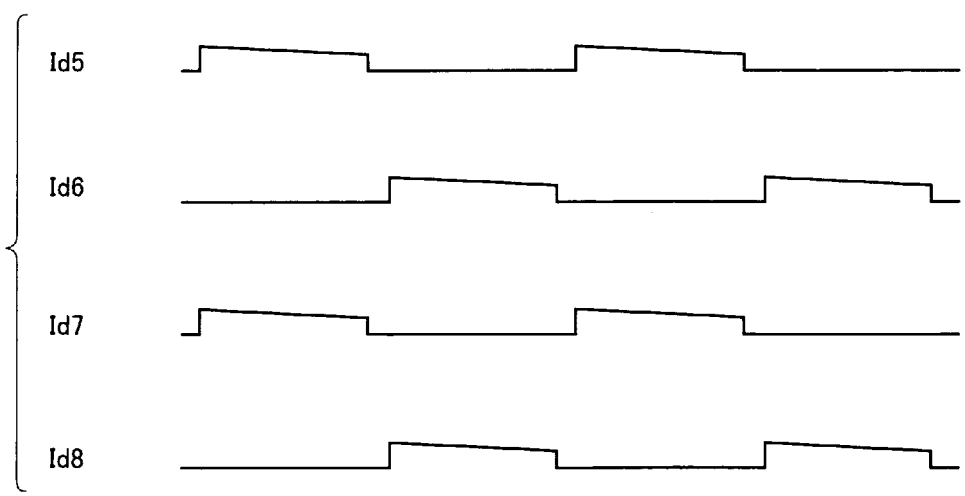
FIG. 26 shows current waveforms of respective portions of the DC—DC conversion circuit in the fourth embodiment.

Leak currents flow through the third n-ch TFT N3 and the third p-ch TFT P3 when the third clock signal YCK+ and the fourth clock signal YCK− are individually inverted. Accordingly, in this embodiment, as shown in voltage waveforms of FIG. 25, the enable signal OE− is set at a low potential to turn off both of the switching elements N5 and N6 during periods from immediately before the third clock signal YCK+ and the fourth clock signal YCK− are inverted to immediately thereafter. Note that waveforms of respective currents Id5 to Id8 in FIGS. 23 and 24 are shown in FIG. 26.

Hence, according to this embodiment, during the periods from immediately before the first clock signal YCK+ and the second clock signal YCK− are inverted to immediately thereafter, the switching elements N5 and N6 are turned off, and thus currents are not allowed to flow through the third n-ch TFT N3 and the third p-ch TFT P3, and accordingly, the leak currents due to these thin film transistors can be prevented from occurring.

What is claimed is:

1. A DC—DC conversion circuit, comprising:
   a first reference voltage source;
   a first capacitor in which a first clock signal source is connected to one end;
   a second capacitor of which one end is connected to a second clock signal source which outputs an inverted signal of a first clock signal;
   a third capacitor for outputting a voltage outputted from the first reference voltage source and boosted;
   a first n-ch thin film transistor of which gate is connected to the other end of the first capacitor, source is connected to the first reference voltage source, and drain is connected to the other end of the second capacitor;
   a first p-ch thin film transistor of which gate is connected to the other end of the first capacitor, source is connected to the third capacitor, and drain is connected to the other end of the second capacitor;
   a first diode connected in a forward direction from the other end of the first capacitor toward the first reference voltage source;
   a second n-ch thin film transistor of which gate is connected to the other end of the second capacitor, source is connected to the first reference voltage source, and drain is connected to the other end of the first capacitor; and
   a second p-ch thin film transistor of which gate is connected to the other end of the second capacitor, source is connected to the third capacitor, and drain is connected to the other end of the first capacitor.

2. The DC—DC conversion circuit of claim 1, wherein an on/off duty ratio of each of the output signals of the first clock signal source and the second clock signal source is 50%.

3. The DC—DC conversion circuit of claim 1 or 2, further comprising switching elements connected to an output stage of the first reference voltage source and an input stage of the third capacitor, respectively,
   wherein the respective switching elements are turned off during periods from immediately before the first clock signal and the second clock signal are inverted to immediately thereafter.

4. A DC—DC conversion circuit, comprising:
   a second reference voltage source;
   a fourth capacitor in which a third clock signal source is connected to one end;
   a fifth capacitor of which one end is connected to a fourth clock signal source which outputs an inverted signal of a third clock signal;
   a sixth capacitor for outputting a voltage outputted from the second reference voltage source and dropped;
   a third p-ch thin film transistor of which gate is connected to the other end of the fourth capacitor, source is connected to the second reference voltage source, and drain is connected to the other end of the fifth capacitor;
   a third n-ch thin film transistor of which gate is connected to the other end of the fourth capacitor, source is connected to the sixth capacitor, and drain is connected to the other end of the fifth capacitor;
   a second diode connected in a forward direction from the other end of the fourth capacitor toward the second reference voltage source;
   a fourth p-ch thin film transistor of which gate is connected to the other end of the fifth capacitor, source is connected to the second reference voltage source, and drain is connected to the other end of the fourth capacitor; and
   a fourth n-ch thin film transistor of which gate is connected to the other end of the fifth capacitor, source is connected to the sixth capacitor, and drain is connected to the other end of the fourth capacitor.

5. The DC—DC conversion circuit of claim 4, wherein an on/off duty ratio of each of the output signals of the third clock signal source and the fourth clock signal source is 50%.

6. The DC—DC conversion circuit of claim 4 or 5, further comprising switching elements connected to an output stage of the second reference voltage source and an input stage of the sixth capacitor, respectively,
   wherein the respective switching elements are turned off during periods from immediately before the third clock signal and the fourth clock signal are inverted to immediately thereafter.

* * * * *